United States Patent [19]

Ishiguro et al.

[11] Patent Number: 5,061,350

[45] Date of Patent: Oct. 29, 1991

[54] METHOD FOR PRODUCING DETECTING ELEMENT

[75] Inventors: Fujio Ishiguro; Toru Kikuchi, both of Nagoya, Japan

[73] Assignee: NGK Insulators, Ltd., Aichi, Japan

[21] Appl. No.: 427,649

[22] Filed: Oct. 27, 1989

[30] Foreign Application Priority Data

Oct. 29, 1988 [JP] Japan .................................. 63-273907

[51] Int. Cl.$^5$ ............................................ H01C 17/00
[52] U.S. Cl. ...................................... 204/37.1; 204/15; 204/38.6; 427/49; 427/125; 427/126.2
[58] Field of Search .............. 427/49, 123, 125, 126.2; 204/37.1, 38.4, 38.6, 15

[56] References Cited

U.S. PATENT DOCUMENTS 4,920,635  5/1990  Yajima .................................. 29/612

Primary Examiner—John F. Niebling
Assistant Examiner—William T. Leader
Attorney, Agent, or Firm—Parkhurst, Wendel & Rossi

[57] ABSTRACT

A detecting element having desired values for electrical resistance and resistance temperature coefficient can be obtained in a simple manner by a method wherein an electrically conductive member is arranged on a substrate, a metal lead is fixed to the substrate in order to connect the electrically conductive member to an external circuit through the metal lead, and the electrically conductive member is subjected to a heat treatment. Specifically, an electrical current is passed through the electrically conductive member to heat the detecting element before completion to a predetermined temperature and to form a glass protecting film by the heat generation of the member itself.

6 Claims, 4 Drawing Sheets

FIG_1a
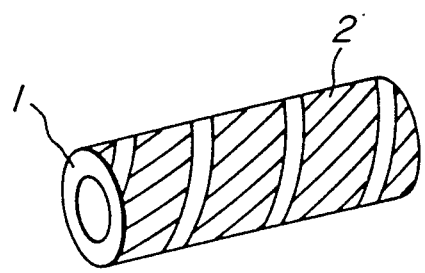
FIG_1b
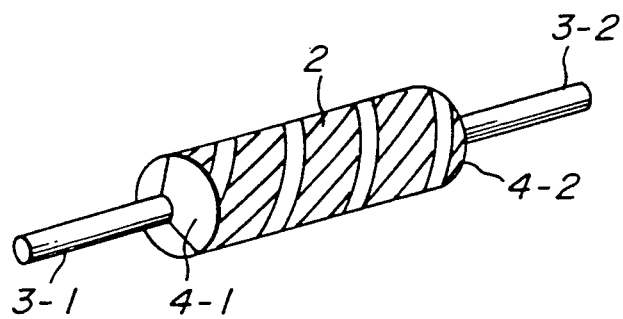
FIG_1c
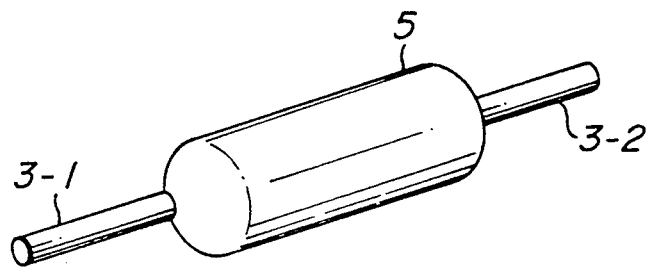

FIG._2a
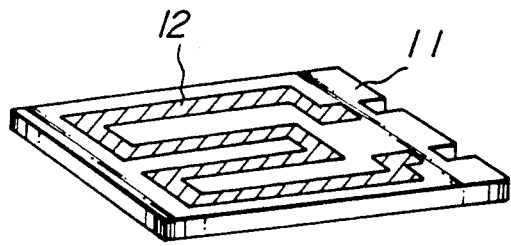
FIG._2b
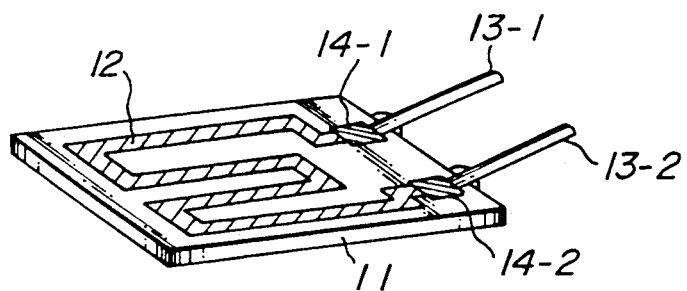
FIG._2c
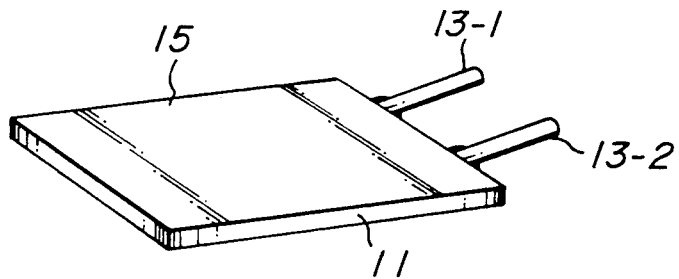

FIG_3a
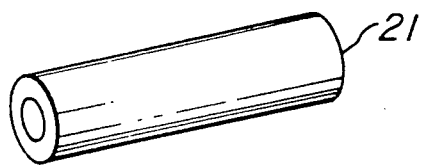
FIG_3b
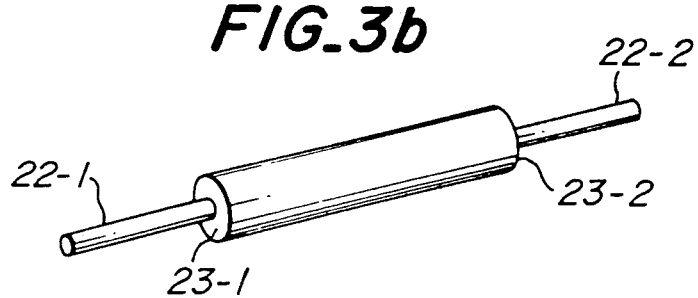
FIG_3c
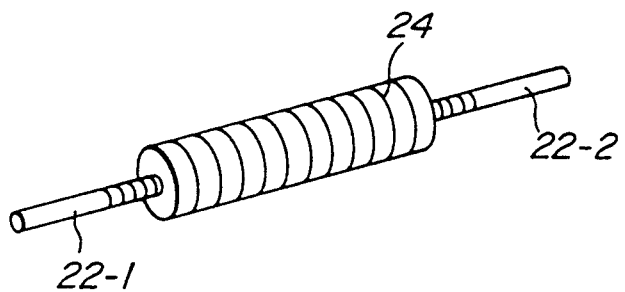
FIG_3d
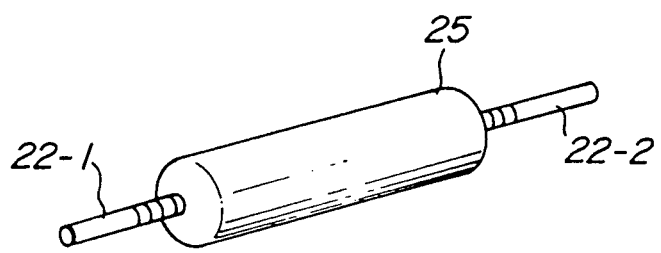

METHOD FOR PRODUCING DETECTING ELEMENT

BACKGROUND OF THE INVENTION

1. Field of the Invention

This invention relates to a method for producing a detecting element to be used for measuring the flow rate of fluid by utilizing a dependence on temperature of the resistance value of the element.

2. Related Art Statement

There has hitherto been known, as the detecting element of this kind, a detecting element, comprising a planar or cylindrical substrate consisting of glass, ceramics or metal, and an electrically conductive member consisting of thin film, thick film, wire or the like, and arranged on the substrate (in the case where metal is used as the substrate, the electrically conductive member is arranged on the metal substrate through an insulating material). A metal lead is fixed to the substrate by an electroconductive paste or glass and connects the electrically conductive member and an external circuit.

The electrically conductive member has been subjected to a baking treatment (heat treatment) by means of a heating furnace (electric furnace) at the formation of a protecting layer which is formed in order to protect the electrically conductive member from the external atmosphere.

However, in the above described conventional method, wherein the heat treatment is carried out by means of a heating furnace, glass is generally used as a protecting layer. Therefore, in the conventional method, it is necessary to use a noble metal, such as platinum or the like, as a metal substrate or as a metal lead in order to prevent the metal lead from being oxidized during the baking of the glass, and hence the resulting detecting element is expensive.

Alternatively, a base metal lead may be used in place of a noble metal lead. However, in this case, it is necessary that a heat treatment is carried out under a reducing atmosphere, $N_2$ atmosphere or Ar atmosphere in order to prevent the oxidation of the base metal lead.

However, glass to be used for a protecting layer is easily foamed or decomposed during the heating under a reducing atmosphere, $N_2$ atmosphere or the like, and due to this foaming phenomenon and the like of glass, the resistance value and the resistance temperature coefficient value of the electrically conductive member are varied. Accordingly, in order to use a base metal lead, it is necessary to control strictly the production condition and the material (glass or the like).

SUMMARY OF THE INVENTION

The object of the present invention is to obviate the above described drawbacks and to provide a method for producing inexpensively a detecting element having excellent detecting properties, in which method the materials can be selected from a wide rang in their combination.

A first aspect of the present invention lies in a method for producing a detecting element, comprising arranging an electrically conductive member on a substrate, fixing a metal lead to the substrate in order to connect the electrically conductive member to an external circuit through the metal lead, and subjecting the electrically conductive member to a heat-treatment. An electric current is passed through the electrically conductive member to heat the detecting element before completion to a predetermined temperature and to form a glass protecting film by the heat generation of the member itself.

A second aspect of the present invention lies in a method for producing a detecting element, comprising arranging an electrically conductive member on a substrate, fixing a metal lead to the substrate in order to connect the electrically conductive member to an external circuit through the metal lead, adjusting the thickness of the electrically conductive member by means of electroplating, and subjecting the electrically conductive member to a heat treatment. An electric current is passed through the electrically conductive member to heat the detecting element before completion to a predetermined temperature and to form a glass protecting film by the heat generation of the member itself.

In the detecting element of the present invention, the metal lead is not heated to a high temperature due to the reason that the electrically conductive member is heated by its own heat generation caused in the member by an electric current passed through the member. Therefore, the detecting element has the following merits.

(1) Base metals, such as stainless steel, iron, nickel or the like, can be used as a metal lead, which base metal is cheaper than noble metal.

(2) The sensitivity of the detecting element is high, because a metal can be used as a lead having a thermal conductivity lower than that of noble metal.

(3) A low melting point glass can be used in the bonding portion of the metal lead with the substrate. The reason is that the bonding portion of the metal lead with the substrate does not reach a high temperature during the heat treatment in the step carried out after the fixing of the metal lead to the substrate, contrary to a conventional method, wherein the bonding portion reaches a high temperature.

(4) A material having low heat resistance can be used as a metal lead. The reason is the same as that explained in the above item (3).

(5) A high melting point material can be used as the protecting layer. The use of a high melting point material as a protecting layer results in a protecting layer having high adhesion strength. Further, when a high melting point glass is used, a harmful ingredient, such as Pb or the like, can be excluded.

(6) The heat treatment or aging can be effected in air. Accordingly, it is not necessary to use a particular atmosphere gas, such as $N_2$, Ar or the like, and hence a detecting element can be produced inexpensively. Further, the heat treatment apparatus to be used for heat treatment in air is simpler in structure than the conventional apparatus to be used for heat treatment under a particular gas atmosphere.

Moreover, a detecting element having a stable resistance value and having an improved temperature coefficient of resistance (T.C.R.) can be obtained.

BRIEF DESCRIPTION OF THE DRAWINGS

FIGS. 1a, 1b and 1c are explanative views illustrating the steps in one embodiment of the methods for producing a detecting element of the present invention;

FIGS. 2a, 2b and 2c are explanative views illustrating the steps in another embodiment of the methods for producing a detecting element of the present invention;

FIGS. 3a-3d are explanatory views illustrating the steps in a further embodiment of the methods for producing a detecting element of the present invention.

DESCRIPTION OF THE PREFERRED EMBODIMENTS

Figure 4:
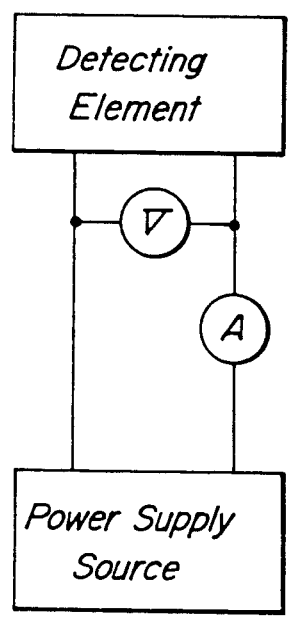
FIG. 4 is a diagrammatic view illustrating the method for passing an electric current through a detecting element of the present invention.

In the method illustrated in FIGS. 1a, 1b and 1c, a platinum film 2 is formed on a substrate consisting of a cylindrical alumina pipe 1 by means of sputtering, and then the film is formed into a spirally wound film as, illustrated in FIG. 1a, by means of a laser trimming operation. Then, as illustrated in FIG. 1b, stainless steel leads 3-1 and 3-2 are inserted into the inner side at both ends of the alumina pipe 1, and a glass-platinum mixture paste is filled between the alumina pipe 1 and each of leads 3-1 and 3-2, and baked in a heating furnace to form baked portions 4-1 and 4-2. Then, each of the stainless steel leads 3-1 and 3-2 is clamped by means of a clip, an alligator clip or a jig for exclusive use (the holing of the lead by means of a clip, an alligator clip or a jig for exclusive use is effective for preventing the temperature rising of the lead up to an excessively high temperature), and a given electric current is passed between the stainless steel leads 3-1 and 3-2 through the platinum film 2 to cause self-heating of the platinum film 2 only. The amount of applied electric current is controlled to a given value, whereby the self-heating temperature of the platinum film is adjusted to a proper temperature to effect the annealing of film and to set desired values for the resistance and resistance temperature coefficient of the platinum film 2. Finally, a glass-protecting layer 5 is formed on the whole surface of the platinum film 2 and the baked portions 4-1 and 4-2 to obtain a detecting element.

In the method illustrated in FIGS. 2a, 2b and 2c, as illustrated in FIG. 2a, a platinum rhodium alloy film 12 is formed on substrate consisting of a beryllia plate 11 by means of a sputtering, and then the film is sputter-etched to form a given pattern. Then, as illustrated in FIG. 2b, nickel leads 13-1 and 13-2 are fixed to the beryllia plate 11 at the vicinity of both ends of the platinum rhodium alloy film 12 by means of glass. A platinum paste is arranged between the alloy film 12 and each of the nickel leads 13-1 and 13-2, and the platinum pastes are baked in a heating furnace to form baked films 14-1 and 14-2. Then, the nickel leads 13 1 and 13-2 are separately clamped, for example, by means of a clip or the like, and, under this state, a given electric current is passed between the nickel leads 13-1 and 13-2 through the platinum rhodium alloy film 12 to cause self-heating of the platinum rhodium alloy film 12 only. The amount of the electric current is controlled to a given value to adjust the temperature of self-heating, whereby the platinum rhodium film 12 is annealed to set desired values for the resistance and the resistance temperature coefficient of the platinum rhodium alloy film 12. Finally, as illustrated in FIG. 2c, a glass protecting film 15 is formed on the whole surface of the beryllia plate 11 to obtain a detecting element.

In the methods illustrated in FIGS. 1a-1c and 2a-2c, the thickness of the electrically conductive member may be adjusted by means of electroplating or the like such that the resulting detecting element has a given resistance value. It is preferable to effect this adjustment before the heat treatment (annealing).

In the method illustrated in FIGS. 3a-3d, as illustrated in FIG. 3b, NiFe alloy leads 22-1 and 22-2 are inserted into the vacant spaces at both ends of a substrate consisting of a cylindrical alumina bobbin 21 illustrated in FIG. 3a, and a glass paste is filled between the alumina bobbin 21 and each of the leads 22-1 22-2, and baked in a heating furnace to form baked portions 23-1 and 23-2. Then, as illustrated in FIG. 3c, a platinum wire 24 having a diameter (for example, 20 $\mu$m) smaller than the diameter of the leads 22-1 and 22-2 is wound spirally around the alumina bobbin 21 such that the winding begins from the lead 22-1 and ends at the lead 22-2. In this winding, when a large number of turns of platinum wire is wound around near the end portion of the alumina bobbin and a small number of turns of platinum wire is wound around near the center portion of the alumina bobbin, the temperature of the alumina bobbin surface during the self-heating carried out in the next step can be made substantially equal at both end portions of the alumina bobbin and at the center portion thereof. In the methods illustrated in FIGS. 1a-1c and FIGS. 2a-2c, the same effect can be obtained by forming a film having a width increasing towards the center portion of the film from both the end portions thereof. In the method illustrated in FIGS. 3a-3d, following to the winding of the platinum wire 24 each of the NiFe alloy leads 22-1 and 22-2 is clamped by, for example, a clip or the like, and a given electric current is passed through the platinum wire 24 to cause the self-heating of the platinum wire 24 only. The amount of the electric current is controlled to a given value to adjust the temperature of this self-heating, whereby the platinum wire 24 is annealed to set desired values for the resistance and the resistance temperature coefficient of the platinum wire 24. Finally, as illustrated in FIG. 3d, a glass-protecting film 25 is formed on the surface of the platinum wire 23 to obtain a detecting element. The heat treatment for the formation of this glass-protecting film may be carried out by the heat generation of the platinum wire 24 itself.

The present invention will be explained hereinafter referring to the following example.

EXAMPLE

On the outer surface of a pipe, which is made of 96% alumina (sintering aid: 4%) and has an outer diameter of 0.5 mm, an inner diameter of 0.25 mm and a length of 4 mm, was formed a platinum film having a thickness of 0.7 $\mu$m by means of a sputtering, and the platinum film was made into a spiral form by means of a laser trimming to form a substrate having a shape illustrated in FIG. 1a.

Then, stainless steel (SUS 304) leads having outer diameters of 0.2 nm and lengths of 4 mm were fixed to both ends of the above described pipe by means of a glass/platinum mixed paste (40/60 vol%) through a baking of the paste effected at 680° C. under an N$_2$ atmosphere. In the resulting green detecting element, the electrically conductive member, that is, the platinum film had a resistance of 350 $\Omega$ at room temperature and a resistance temperature coefficient (T.C.R.) of 2,400 ppm/K at 0–100° C.

Then, the green detecting element was arranged in a circuit illustrated in FIG. 4, and an electric current was passed through the green detecting element to heat the element. During the heating, the surface temperature of the detecting element was measured by means of a radiation thermometer, and was subjected to a power control so as to be a predetermined surface temperature. That is, after passage of electric current for 3 hours at a surface temperature of 750° C. (0.9 W), the resistance value was stabilized at a low value of 305 Ω, and the resistance temperature coefficient (T.C.R.) became 3,400 ppm/κ.

Then, a glass powder paste was applied on and adhered to the platinum film, and a heat treatment schedule, which comprised drying at 250° C., removal of organic binder and the like at 350° C. and melting at 800° C., was carried out by passing an electric current through the platinum film to form a glass-protecting layer as illustrated in FIG. 1c.

There were no troubles, wherein the stainless steel lead was oxidized, and the fixed portion of the lead was released during the heating by the electric current.

The present invention is not limited to the above described example and can be variously modified and changed. For example, although the platinum film is formed by means of a sputtering in the above described example, the platinum film can be formed by means of vapor deposition, chemical plating or a combination thereof. Further, it has been ascertained that, even in the case where another film is superposed by means of an electroplating on the film which has been formed by means of the above described sputtering, vapor deposition, chemical plating or the like, the effect for improving the properties of film by the heating by electric current is the same in the superposed films and in the original single film.

As described above, according to the method for producing a detecting element of the present invention, the heat treatment of the electrically conductive member is carried out by utilizing the heat generation of the electrically conductive member itself caused by passing an electric current through the member, and hence the materials can be selected from a wide range in their combination and a detecting element having improved properties can be inexpensively obtained.

What is claimed is:

1. A method for producing a resistive detecting element, comprising:
   providing a substrate;
   providing an electrically conductive member on a surface of said substrate;
   fixing metal lead members to said substrate to be in electrical communication with said electrically conductive member;
   applying a first electrical current from an external power source to said electrically conductive member through said metal lead members, whereby said first electrical current generates heat in said electrically conductive member and said heat anneals said electrically conductive member;
   providing a glass material on a surface of said substrate to cover at least said electrically conductive member; and
   applying a second electrical current from said external power source to said electrically conductive member through said metal lead members, whereby said second electrical current generates heat in said electrically conductive member and said heat metals said glass material to provide a glass protective film for at least said electrically conductive member.

2. The method of claim 1, further comprising, after said metal lead members are fixed to said substrate, adjusting a thickness of the electrically conductive member by means of electroplating.

3. The method of claim 1, wherein said heat generated in said electrically conductive member is controlled to stabilize the electrical properties of the resistive detecting element.

4. A method for producing a resistive detecting element, comprising:
   providing a substrate;
   providing an electrically conductive member on a surface of said substrate;
   fixing metal lead members to said substrate to be in electrical communication with said electrically conductive member;
   providing a glass material on a surface of said substrate to cover at least said electrically conductive member; and
   applying an electrical current from an external power source to said electrically conductive member through said metal lead members, whereby said electrical current generates heat in said electrically conductive member and said heat anneals said electrically conductive member, and melts said glass material to provide a glass protective film for at least said electrically conductive member.

5. The method of claim 4, further comprising, after said metal lead members are fixed to said substrate, adjusting a thickness of the electrically conductive member by means of electroplating.

6. The method of claim 4, wherein said heat generated in said electrically conductive member is controlled to stabilize the electrical properties of the resistive detecting element.

* * * * *